(12) United States Patent
Leeson

(10) Patent No.: US 12,411,288 B2
(45) Date of Patent: *Sep. 9, 2025

(54) FIBER OPTIC CONNECTOR HAVING FLATTENED REGIONS THAT FACE AND ALIGN TO PREVENT ROTATION

(71) Applicant: PPC BROADBAND FIBER LTD., Woodbridge (GB)

(72) Inventor: Kim Leeson, Ipswich (GB)

(73) Assignee: PPC BROADBAND FIBER LTD., Woodbridge (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/741,269

(22) Filed: May 10, 2022

(65) Prior Publication Data
US 2022/0269015 A1 Aug. 25, 2022

Related U.S. Application Data

(63) Continuation of application No. 16/900,861, filed on Jun. 12, 2020, now Pat. No. 11,327,245.

(60) Provisional application No. 62/860,283, filed on Jun. 12, 2019.

(51) Int. Cl.
*G02B 6/38* (2006.01)

(52) U.S. Cl.
CPC ......... *G02B 6/3821* (2013.01); *G02B 6/3869* (2013.01); *G02B 6/3887* (2013.01); *G02B 6/3893* (2013.01); *G02B 6/3888* (2021.05)

(58) Field of Classification Search
None
See application file for complete search history.

(56) References Cited

U.S. PATENT DOCUMENTS 6,325,547 B1 * 12/2001 Cammons ............ G02B 6/3851
 385/139
6,848,836 B2 * 2/2005 Ueda .................... G02B 6/3869
 385/88

(Continued)

FOREIGN PATENT DOCUMENTS

EP 1091227 A1 4/2001
WO 2017209601 A2 12/2017

OTHER PUBLICATIONS

Search Report dated Oct. 8, 2020 in corresponding International Application No. PCT/IB2020/000476, 4 pages.

(Continued)

*Primary Examiner* — Andrew Jordan
(74) *Attorney, Agent, or Firm* — MH2 TECHNOLOGY LAW GROUP LLP

(57) ABSTRACT

An optical fiber connector sub-assembly for an optical fiber connector includes a ferrule configured to hold an optical fiber therein, a ferrule holder configured to hold the ferrule, a retaining tube configured to hold the ferrule holder and receive a fiber optic cable, and a connecting tube configured to be rotatingly coupled with the ferrule holder and slidingly received by the retaining tube. The ferrule holder, the retaining tube, and the connecting tube are configured to receive an optical fiber, and the retaining tube and the connecting tube are configured to cooperate with one another to prevent relative rotation between the ferrule holder and the retaining tube.

23 Claims, 10 Drawing Sheets

(56) References Cited

U.S. PATENT DOCUMENTS

| | | | | |
|---|---|---|---|---|
| 7,281,859 B2* | 10/2007 | Mudd | G02B 6/3869 | |
| | | | 385/83 | |
| 9,176,285 B2* | 11/2015 | Nhep | G02B 6/3861 | |
| 9,551,842 B2* | 1/2017 | Theuerkorn | G02B 6/3869 | |
| 9,638,869 B2* | 5/2017 | Nhep | G02B 6/3893 | |
| 9,874,907 B2 | 1/2018 | Wang | | |
| 9,921,375 B2* | 3/2018 | Compton | G02B 6/3877 | |
| 10,126,508 B2* | 11/2018 | Compton | G02B 6/3877 | |
| 10,295,759 B2* | 5/2019 | Wong | G02B 6/3869 | |
| 10,371,899 B2* | 8/2019 | Nhep | G02B 6/3888 | |
| 10,444,438 B2* | 10/2019 | Leeson | G02B 6/38875 | |
| 10,520,686 B2* | 12/2019 | Wong | G02B 6/387 | |
| 10,551,573 B2* | 2/2020 | Baca | C09J 179/08 | |
| 10,656,345 B2* | 5/2020 | Crawford | G02B 6/3893 | |
| 10,712,511 B2* | 7/2020 | Wong | G02B 6/3833 | |
| 10,948,664 B2* | 3/2021 | Takano | G02B 6/389 | |
| 11,009,667 B2* | 5/2021 | Isenhour | G02B 6/3825 | |
| 11,256,041 B2* | 2/2022 | Wong | G02B 6/381 | |
| 11,327,245 B2* | 5/2022 | Leeson | G02B 6/3887 | |
| 11,372,167 B2* | 6/2022 | Leeson | G02B 6/38875 | |
| 11,385,416 B2* | 7/2022 | Takano | G02B 6/3888 | |
| 2004/0105625 A1* | 6/2004 | Ueda | G02B 6/3851 | |
| | | | 385/78 | |
| 2006/0115219 A1* | 6/2006 | Mudd | G02B 6/3869 | |
| | | | 385/60 | |
| 2007/0098331 A1* | 5/2007 | Mudd | G02B 6/3869 | |
| | | | 385/86 | |
| 2016/0124159 A1* | 5/2016 | Nhep | G02B 6/3861 | |
| | | | 385/80 | |
| 2016/0139343 A1* | 5/2016 | Dean, Jr. | G02B 6/3821 | |
| | | | 29/428 | |
| 2016/0209602 A1* | 7/2016 | Theuerkorn | G02B 6/3858 | |
| 2017/0160487 A1* | 6/2017 | Clarke | G02B 6/3834 | |
| 2017/0261696 A1* | 9/2017 | Compton | G02B 6/3869 | |
| 2017/0261698 A1* | 9/2017 | Compton | G02B 6/3893 | |
| 2017/0336573 A1* | 11/2017 | Nhep | G02B 6/3861 | |
| 2018/0217335 A1* | 8/2018 | Leeson | G02B 6/3833 | |
| 2018/0329157 A1* | 11/2018 | Crawford | G02B 6/3874 | |
| 2018/0335581 A1* | 11/2018 | Wong | G02B 6/381 | |
| 2018/0372962 A1* | 12/2018 | Isenhour | G02B 6/3894 | |
| 2019/0011641 A1* | 1/2019 | Isenhour | G02B 6/3893 | |
| 2019/0086615 A1* | 3/2019 | Rosson | G02B 6/3831 | |
| 2019/0346634 A1* | 11/2019 | Takano | G02B 6/3888 | |
| 2020/0116954 A1* | 4/2020 | Rosson | G02B 6/3879 | |
| 2020/0124802 A1* | 4/2020 | Wong | G02B 6/3825 | |
| 2020/0150350 A1* | 5/2020 | Leeson | G02B 6/3893 | |
| 2020/0341212 A1* | 10/2020 | Wong | G02B 6/3885 | |
| 2020/0341213 A1* | 10/2020 | Wong | G02B 6/3893 | |
| 2020/0393627 A1* | 12/2020 | Leeson | G02B 6/3887 | |
| 2021/0055481 A1* | 2/2021 | Leeson | G02B 6/3833 | |
| 2021/0157062 A1* | 5/2021 | Bickham | G02B 6/3854 | |
| 2021/0173155 A1* | 6/2021 | Takano | G02B 6/3888 | |
| 2021/0239913 A1* | 8/2021 | Isenhour | G02B 6/3877 | |
| 2021/0364705 A1* | 11/2021 | Crawford | G02B 6/3893 | |
| 2022/0128771 A9* | 4/2022 | Crawford | G02B 6/3893 | |
| 2022/0236496 A1* | 7/2022 | Leeson | G02B 6/3871 | |
| 2022/0269015 A1* | 8/2022 | Leeson | G02B 6/3887 | |

OTHER PUBLICATIONS

Written Opinion dated Oct. 8, 2020 in corresponding International Application No. PCT/IB2020/000476, 6 pages.

European Communication pursuant to Article 94(3) EPC dated Nov. 21, 2023 in corresponding European Application No. 20745261.6, 6 pages.

Indian First Examination Report dated May 6, 2024 in corresponding Indian Application No. 202217000825, 7 pages.

* cited by examiner

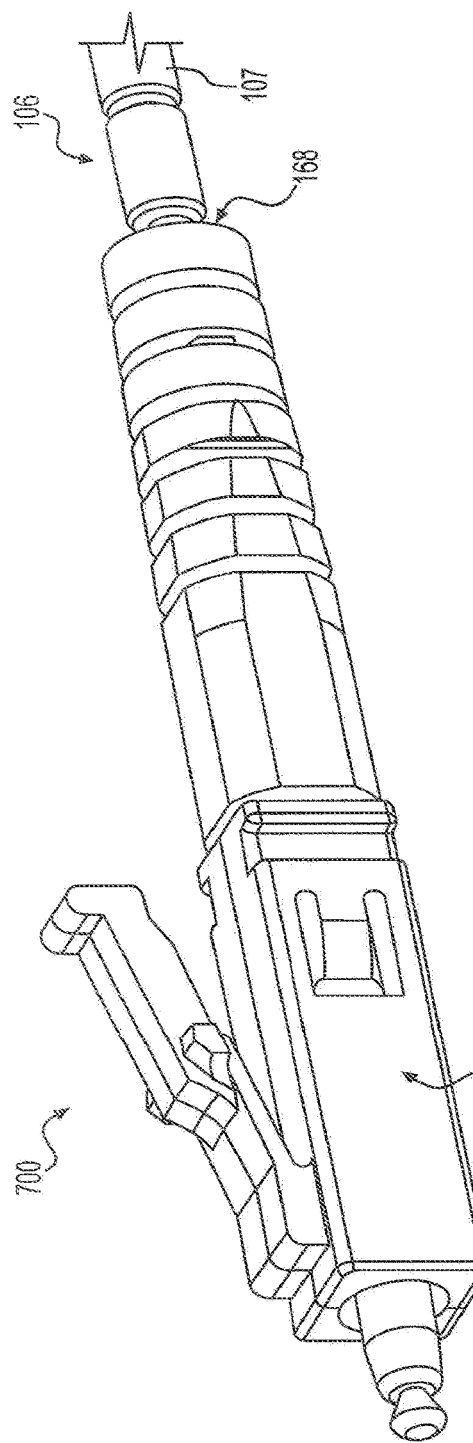
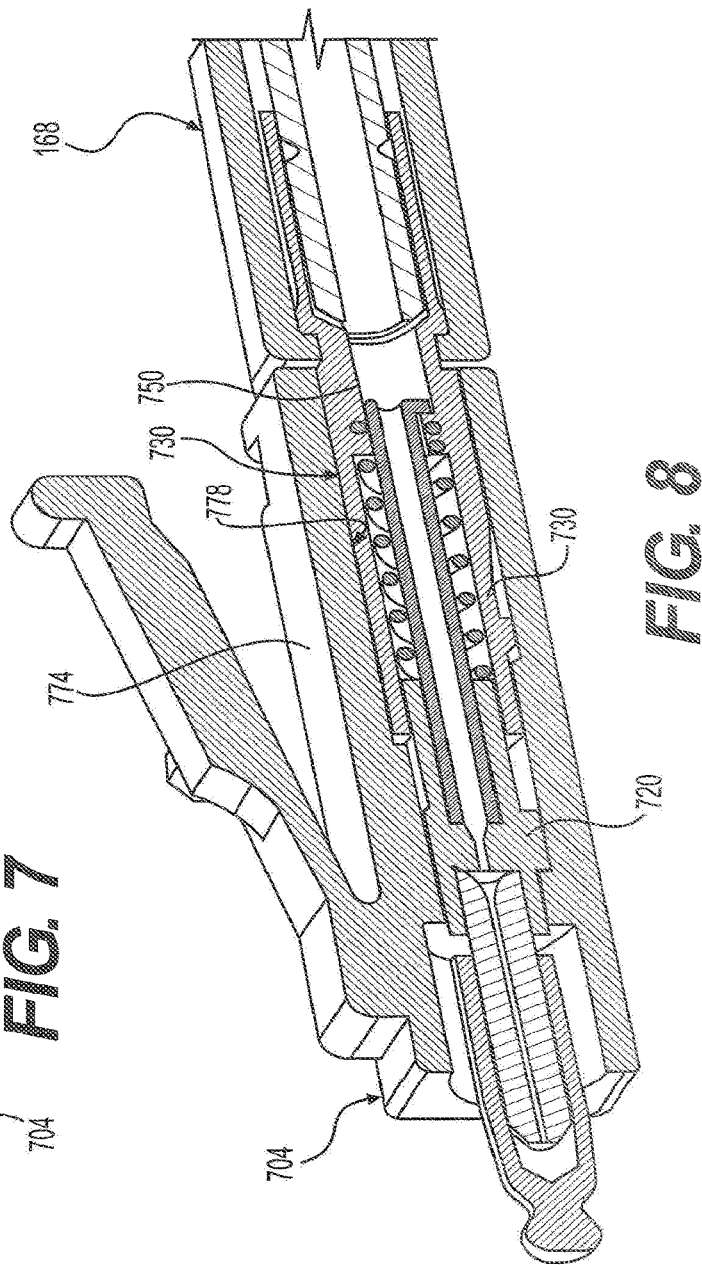

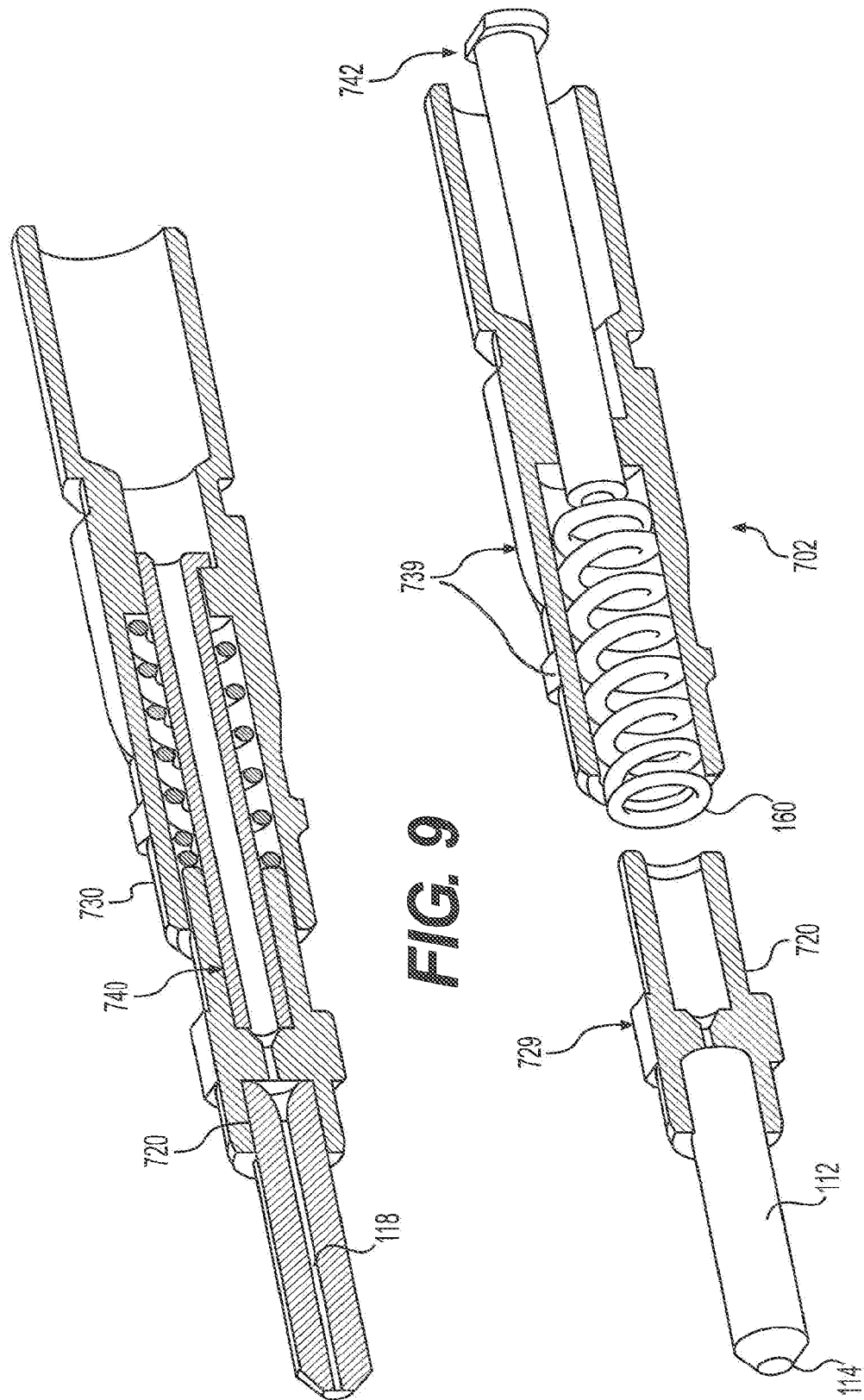

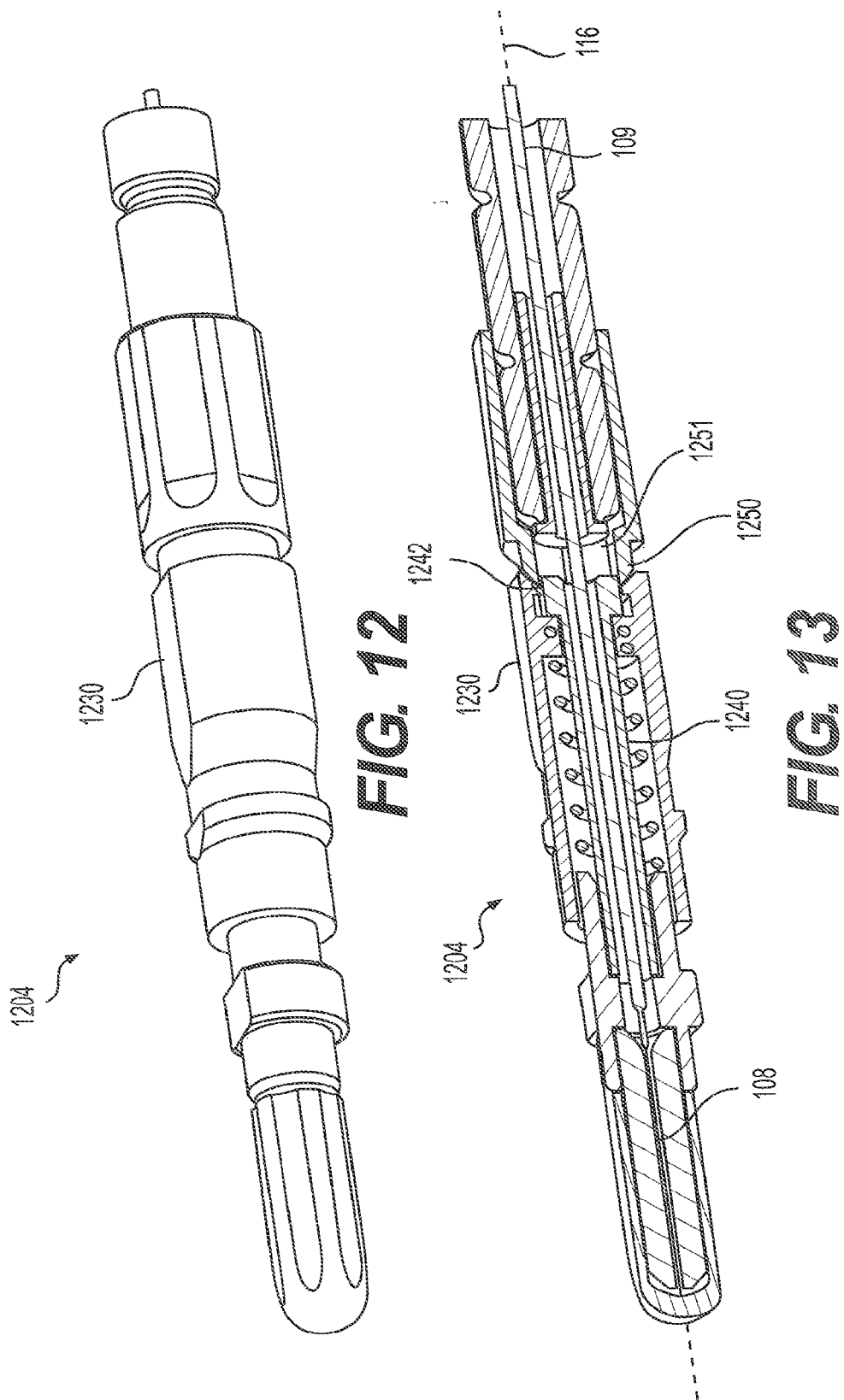

FIBER OPTIC CONNECTOR HAVING FLATTENED REGIONS THAT FACE AND ALIGN TO PREVENT ROTATION

CROSS-REFERENCE TO RELATED APPLICATIONS

This application is a continuation of U.S. Nonprovisional application Ser. No. 16/900,861 filed Jun. 12, 2020, which claims the benefit of U.S. Provisional Application No. 62/860,283, filed Jun. 12, 2019, the disclosures of which are hereby incorporated by reference in their entireties.

BACKGROUND

The present disclosure relates to an optical fiber connector, for example, an LC (Lucent Connector) connector. More particularly, the disclosure relates to a fiber optic connector that prevents a fiber that is connected to the connector from rotating relative to the connector when being pushed through a duct or conduit.

The mechanical tolerances involved in terminating single mode optical fiber are much tighter than those for multimode optical fiber. Therefore, while it is quite common for multimode optical fiber be terminated at the point of use, for example, at a user's premises or at an outside junction box, in most product applications, single mode optical fiber is not terminated in the field. When single mode fiber must be terminated in the field, then it can take a skilled technician between about 15 to 20 minutes to splice fibers together either by using a V-groove clamp or expensive fusion welding equipment.

Single mode fiber is therefore often provided in a range of different lengths, pre-terminated at both ends with a connector that is configured to be connected with an outer housing after the pre-terminated end is deployed to its desired location. The pre-terminated end and housing is then ready to plug into a matching receptacle.

One example of such a connector is an LC connector. The LC connector and adapters were originally developed by Lucent Technologies. The LC connector is a miniaturized version of the fiber optic SC (Subscriber Connector) connector, thus being also known as a small form factor connector. The LC connector looks somewhat similar to the SC connector, but is about half the size with a 1.25 mm ferrule instead of a 2.5 mm ferrule. LC connectors are typically composed of a plastic housing with an RJ45 push-pull style clip.

Conventional optical fiber LC connectors comprise a rigid pushable structure to allow for limited movement of the connector parts while being pushed down stretches of duct. However, conventional optical fiber LC connectors permit rotation between the fiber and the connector when the connector is being pushed through the duct. Such rotation could cause damage to the fiber, which may result in signal degradation or signal loss.

Therefore, it may be desirable to provide an optical fiber connector that prevents rotation of the fiber relative to the connector while being pushed through a duct or conduct.

SUMMARY

In accordance with various embodiments of the disclosure, an optical fiber connector sub-assembly for an optical fiber connector includes a ferrule configured to hold an optical fiber therein along an axis of the connector, a ferrule holder configured to hold the ferrule at a front portion of the connector, a retaining tube having a front end portion configured to hold the ferrule holder and a rear end portion configured to receive a fiber optic cable, and a connecting tube configured to be received in the ferrule holder in a press fit relationship such that the connecting tube is rotatingly coupled with the ferrule holder, and the connecting tube being configured to be slidingly received by the retaining tube. The ferrule holder, the retaining tube, and the connecting tube are configured to receive an optical fiber, and the ferrule is configured to terminate the optical fiber. The connecting tube includes a head portion having a flattened region, and wherein the retaining tube includes an inner wall having a flattened inner region configured to be aligned with the flattened region of the connecting tube to prevent relative rotation between the ferrule holder and the retaining tube.

According to various aspects, a fiber optic connector includes the aforementioned optical fiber connector sub-assembly and an outer housing configured to be coupled with the optical fiber connector sub-assembly. The outer housing is configured to provide LC-style push/pull engagement/disengagement with a mating optical fiber socket.

In some aspects, the retaining tube includes a forward end portion and a rearward end portion, the forward end portion and the rearward end portion being separated at an interior of the retaining tube by an inner annular shoulder.

In various aspects, the forward end portion of the retaining tube includes a bore configured to slidingly receive at least a portion of the cylindrical stem portion of the ferrule holder, the rearward end portion of the retaining tube includes a bore configured to slidingly receive the connecting tube, and the connecting tube extends through a bore defined by the inner annular shoulder.

According to some aspects, the head portion of the elongated cylindrical portion of the connecting tube includes at least one additional flattened region, and the inner wall of the rearward end portion of the retaining tube includes at least one additional flattened inner region configured to be aligned with the at least one additional flattened region of the connecting tube.

According to various embodiments of the disclosure, an optical fiber connector sub-assembly for an optical fiber connector includes a ferrule configured to hold an optical fiber therein, a ferrule holder configured to hold the ferrule, a retaining tube having a front end portion configured to hold the ferrule holder and a rear end portion configured to receive a fiber optic cable, and a connecting tube configured to be rotatingly coupled with the ferrule holder and slidingly received by the retaining tube. The ferrule holder, the retaining tube, and the connecting tube are configured to receive an optical fiber, and the connecting tube includes a head portion having a flattened region. The retaining tube includes an inner wall having a flattened inner region configured to be aligned with the flattened region of the connecting tube to prevent relative rotation between the ferrule holder and the retaining tube.

According to various aspects, a fiber optic connector includes the aforementioned optical fiber connector sub-assembly and an outer housing configured to be coupled with the optical fiber connector sub-assembly. The outer housing is configured to provide LC-style push/pull engagement/disengagement with a mating optical fiber socket.

In some aspects, the retaining tube includes a forward end portion and a rearward end portion, the forward end portion and the rearward end portion being separated at an interior of the retaining tube by an inner annular shoulder.

In various aspects, the forward end portion of the retaining tube includes a bore configured to slidingly receive at least a portion of the cylindrical stem portion of the ferrule holder, the rearward end portion of the retaining tube includes a bore configured to slidingly receive the connecting tube, and the connecting tube extends through a bore defined by the inner annular shoulder.

According to some aspects, the head portion of the elongated cylindrical portion of the connecting tube includes at least one additional flattened region, and the inner wall of the rearward end portion of the retaining tube includes at least one additional flattened inner region configured to be aligned with the at least one additional flattened region of the connecting tube In accordance with various embodiments of the disclosure, an optical fiber connector sub-assembly for an optical fiber connector includes a ferrule configured to hold an optical fiber therein, a ferrule holder configured to hold the ferrule, a retaining tube configured to hold the ferrule holder and receive a fiber optic cable, and a connecting tube configured to be rotatingly coupled with the ferrule holder and slidingly received by the retaining tube. The ferrule holder, the retaining tube, and the connecting tube are configured to receive an optical fiber, and the retaining tube and the connecting tube are configured to cooperate with one another to prevent relative rotation between the ferrule holder and the retaining tube.

According to various aspects, a fiber optic connector includes the aforementioned optical fiber connector sub-assembly and an outer housing configured to be coupled with the optical fiber connector sub-assembly. The outer housing is configured to provide LC-style push/pull engagement/disengagement with a mating optical fiber socket In some aspects, the retaining tube includes a forward end portion and a rearward end portion, the forward end portion and the rearward end portion being separated at an interior of the retaining tube by an inner annular shoulder.

In various aspects, the forward end portion of the retaining tube includes a bore configured to slidingly receive at least a portion of the cylindrical stem portion of the ferrule holder, the rearward end portion of the retaining tube includes a bore configured to slidingly receive the connecting tube, and the connecting tube extends through a bore defined by the inner annular shoulder.

According to some aspects, the connecting tube includes an elongated cylindrical portion having a head portion at its rear end, the head portion including a flattened region, and the rearward end portion of the retaining tube includes an inner wall having a flattened inner region configured to be aligned with the flattened region of the connecting tube.

According to various aspects, the head portion of the elongated cylindrical portion of the connecting tube includes at least one additional flattened region, and the inner wall of the rearward end portion of the retaining tube includes at least one additional flattened inner region configured to be aligned with the at least one additional flattened region of the connecting tube.

In some aspects, a forward end portion of the connecting tube is configured to be received in the ferrule holder in a press fit relationship such that the connecting tube is rotatable with the ferrule holder.

BRIEF DESCRIPTION OF THE DRAWINGS

Embodiments of the invention will now be further described, by way of example only, and with reference to the accompanying drawings, in which:

FIG. 7 is a perspective view of another exemplary fiber optic connector in accordance with various aspects of the disclosure;

FIG. 8 is a cross-sectional perspective view of the connector subassembly of FIG. 7;

FIG. 9 is a cross-sectional perspective view of the connector subassembly of FIG. 7;

FIG. 10 is an exploded, cross-sectional perspective view of the connector subassembly of FIG. 7;

FIG. 12 is a perspective view of another connector sub-assembly for the fiber optic connector of FIG. 7;

FIG. 13 is a cross-sectional perspective view of the connector subassembly of FIG. 12.

DETAILED DESCRIPTION OF EMBODIMENTS

Figure 1:
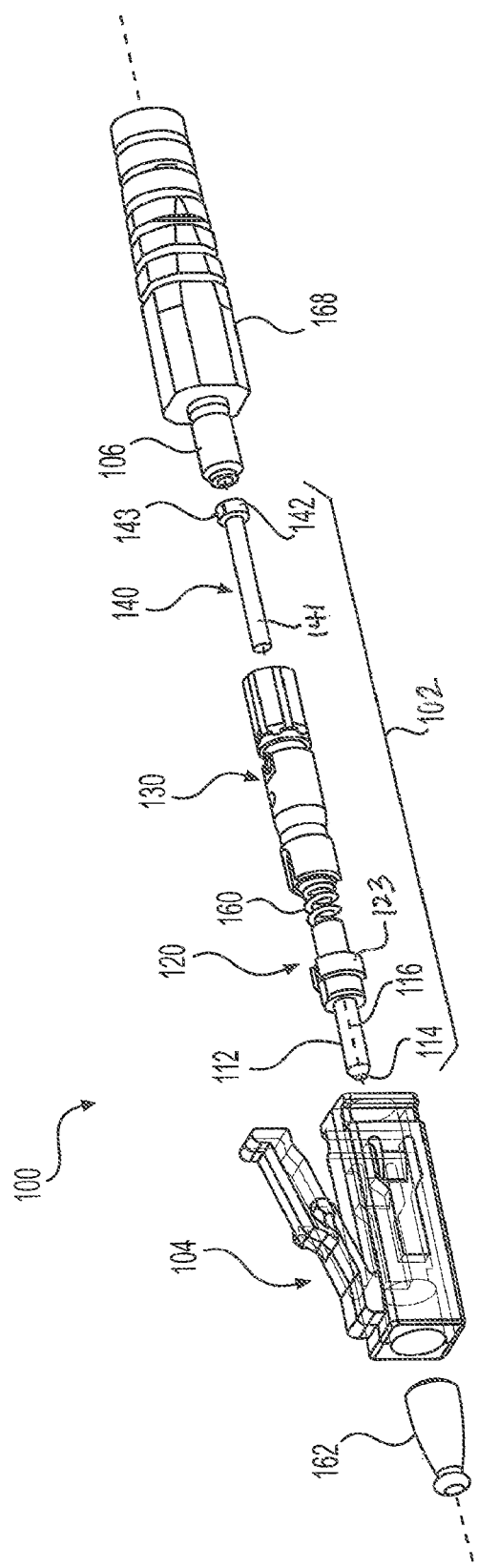
FIG. 1 is an exploded perspective view of an exemplary fiber optic connector in accordance with various aspects of the disclosure.

FIGS. 1-6 illustrate an exemplary fiber optic connector 100, for example, an LC connector, in accordance with various aspects of the disclosure. The fiber optic connector 100 includes a connector sub-assembly 102 and an outer housing 104. In some aspects, the outer housing 104 may be an LC housing configured to be received by a conventional matching LC receptacle. That is, the outer housing 104 may be configured to provide LC-style push/pull engagement/disengagement with a mating optical fiber socket (not shown). The fiber optic connector 100 is configured to be coupled with a fiber optic cable 106. For example, an end of the cable 106 is configured to be terminated with the connector sub-assembly 102.

The connector sub-assembly 102 includes an elongate cylindrical optical fiber ferrule 112 having at one end a termination end 114. In this example, the ferrule 112 is of a ceramic material, although other materials may be used, as is known in the art. The ferrule 112 has an axis 116 that extends centrally through the fiber optic connector 100, and along its axis 116 has a hollow core 118 that holds and aligns an optical fiber 108 of the cable 106, which will most often be a single mode glass fiber. The person skilled in the art will recognize this as a conventional arrangement, in which the fiber 108 is terminated at the ferrule termination end 114, which is polished to minimize insertion loss when the connector is joined to a matching optical fiber socket (not shown).

The connector sub-assembly 102 also includes a ferrule holder 120 (i.e. a holding portion), a generally cylindrical retaining tube 130 (i.e., a retaining tube), and a connecting tube 140 (i.e. connecting portion). The ferrule holder 120 has a base portion 122 at its forward end in which the ferrule 112 is seated, a collar 123, and a cylindrical stem portion 124 which extends from the collar 123 in an axial direction away from the ferrule 112. The collar 123 includes an external annular shoulder 126 and an internal annular shoulder 128. The base portion 122 is configured to receive the ferrule 112 in a press-fit relationship with a rear face of the ferrule 122 abutting a forward face 127a of the internal annular shoulder 128, as would be understood by persons skilled in the art.

The retaining tube 130 includes a forward end portion 132 and a rearward end portion 134. The forward end portion 132 and the rearward end portion 134 are separated at an interior of the retaining tube 130 by an inner annular shoulder 136. The forward end portion 132 includes an external shoulder portion 133 defining a rearward facing surface. The forward end portion 132 includes a bore 131 configured to slidingly receive at least a portion of the cylindrical stem portion 124 of the ferrule holder 120. The rearward end portion 134 includes a bore 135 configured to slidingly receive the connecting tube 140, which extends through a closely fitting bore 137 defined by the inner annular shoulder 136.

The connecting tube 140 includes an elongated cylindrical portion 141 having a head portion 142 at its rear end. The head portion 142 has a larger cross-section in a plane perpendicular to the ferrule axis than does the elongated cylindrical portion 141. The head portion 142 may be generally cylindrical, but includes a flattened region 143 that forms, for example, a chord, such that the head portion 142 is formed in a D-shape as viewed in the axial direction.

A forward end portion of the elongated cylindrical portion 141 is configured to be received in the cylindrical stem portion 124, for example, in a press fit relationship, more particularly, a light press fit connection. The press fit relationship should be sufficient such that the connecting tube 140 is rotatable with the cylindrical stem portion 124 about ferrule axis 116 and not rotatable relative to the cylindrical stem portion 124 when the connector subassembly 102 is being pushed through a duct or conduct. The forward end face 144 at the forward end portion of the elongated cylindrical portion 141 abuts a rearward face 127b of the internal annular shoulder 128 of the collar 123. A forward face 146 of the head portion 142 abuts a rearward face 136a of the inner annular shoulder 136 of the retaining tube 130.

The rearward end portion 134 of the retaining tube 130 includes a small inner diameter portion 150 adjacent the inner annular shoulder 136 and a large inner diameter portion 152 extending axially from the small inner diameter portion 150 in a direction away from the inner annular shoulder 136. The large inner diameter portion 152 has a larger inside diameter than the small inner diameter portion 150. The retaining tube 130 may include a tapered or stepped transition between the small inner diameter portion 150 and the large inner diameter portion 152.

Figure 2:
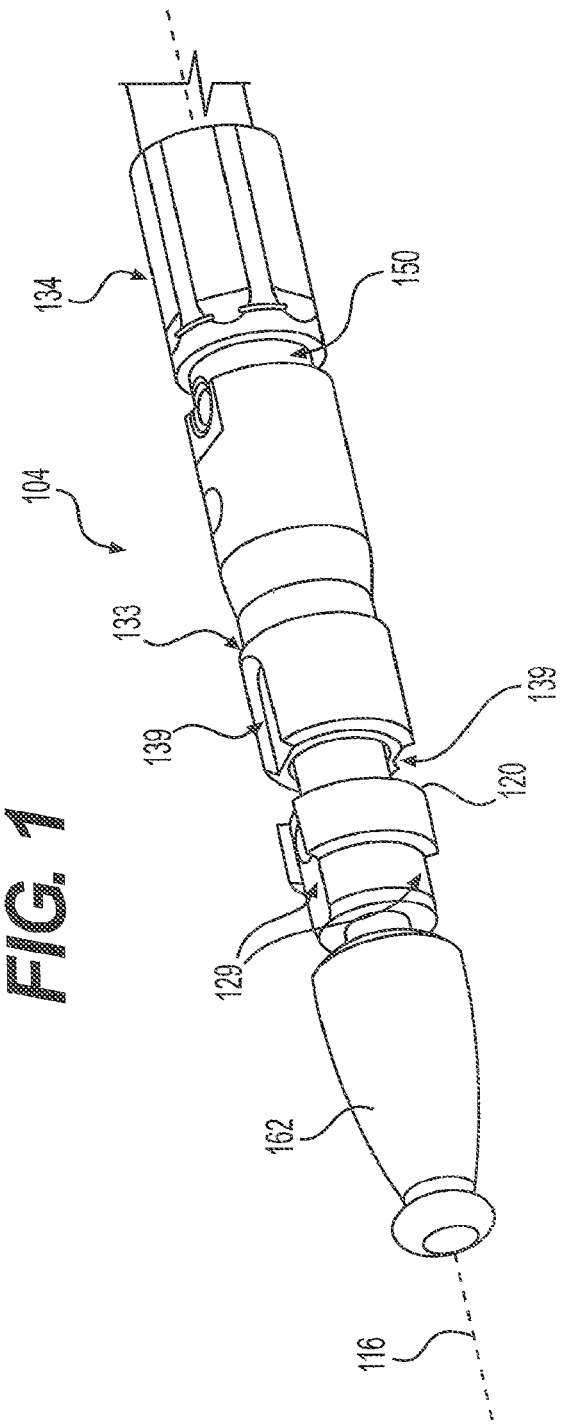
FIG. 2 is a perspective view of the connector subassembly of the fiber optic connector of FIG. 1.
Figure 3:
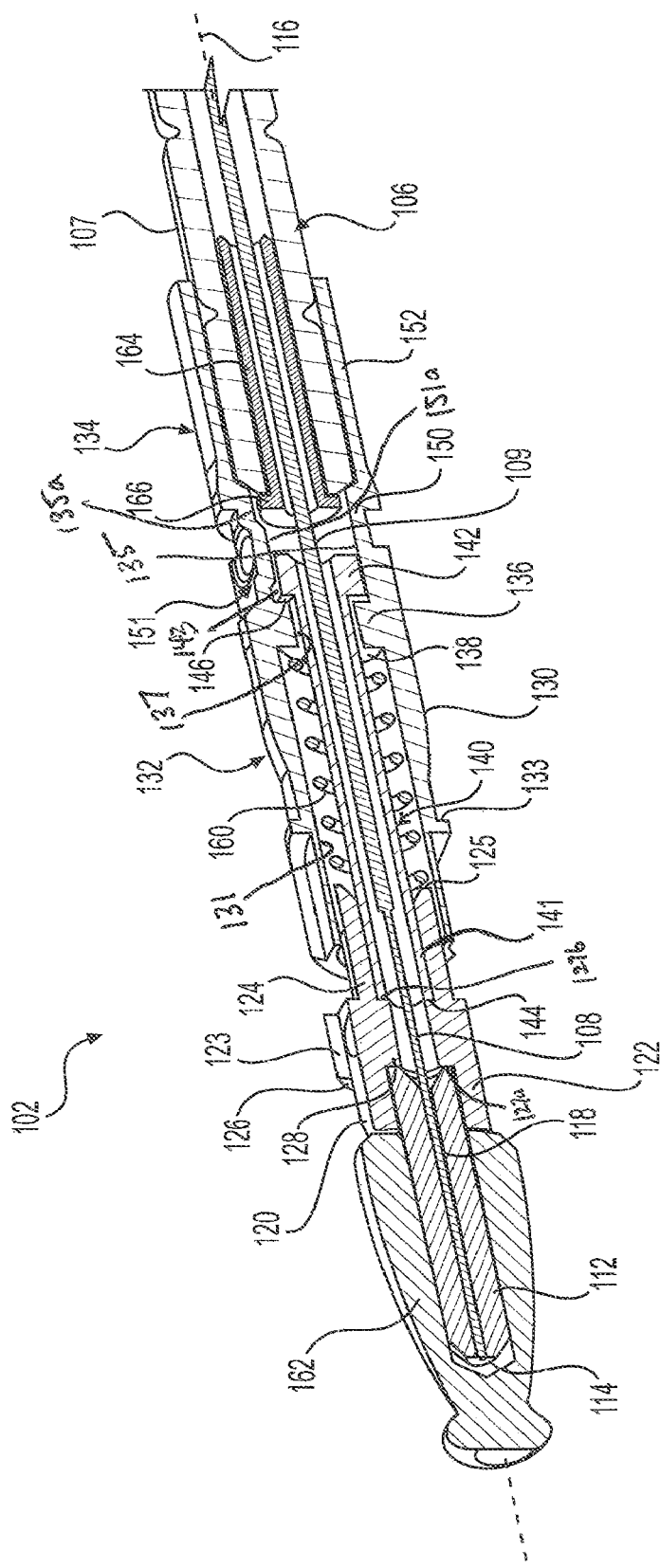
FIG. 3 is a cross-sectional perspective view of the connector subassembly of FIG. 2.

The large inner diameter portion 152 is sized and configured to receive the cable 106, including a sheath 107 that protects the fiber 108. After receiving the cable 106, including the sheath 107, the large diameter portion 152 is crimped onto the sheath 107 of the cable 106, as shown in FIGS. 1 and 2. The small inner diameter portion 150 has a smaller diameter than the outside diameter of the sheath 107 and is thus sized and configured to prevent the sheath 107 from entering the small diameter portion 150. However, the small inner diameter portion 150 is sized and configured to receive the fiber 108 and buffering layers 109 that encircle the fiber 108 and are encircled by the sheath 107. Thus, the transition between the small inner diameter portion 150 and the large inner diameter portion 152 provides a stop for limiting the axial insertion of the cable 106 into the retaining tube 130.

The small diameter portion 150 of the retaining tube 130 includes a deformed region 151 that protrudes radially inward from an inner wall 135a of the bore 135 of the small diameter portion 150. The deformed region 151 may be formed by controlled peening, crimping, or the like. The deformed region 151 forms an indent having a flattened inner region 151a configured to be aligned with the flattened region 143 of the head portion 142 of the connecting tube 140. When the head portion 142 of the connecting tube 140 is received in the generally cylindrical bore small diameter portion 150 of the retaining tube 130, the deformed region 151 cooperates with the flattened region 143 of the head portion 142 to prevent relative rotation between the connecting tube 140 and the retaining tube 130.

Figure 4:
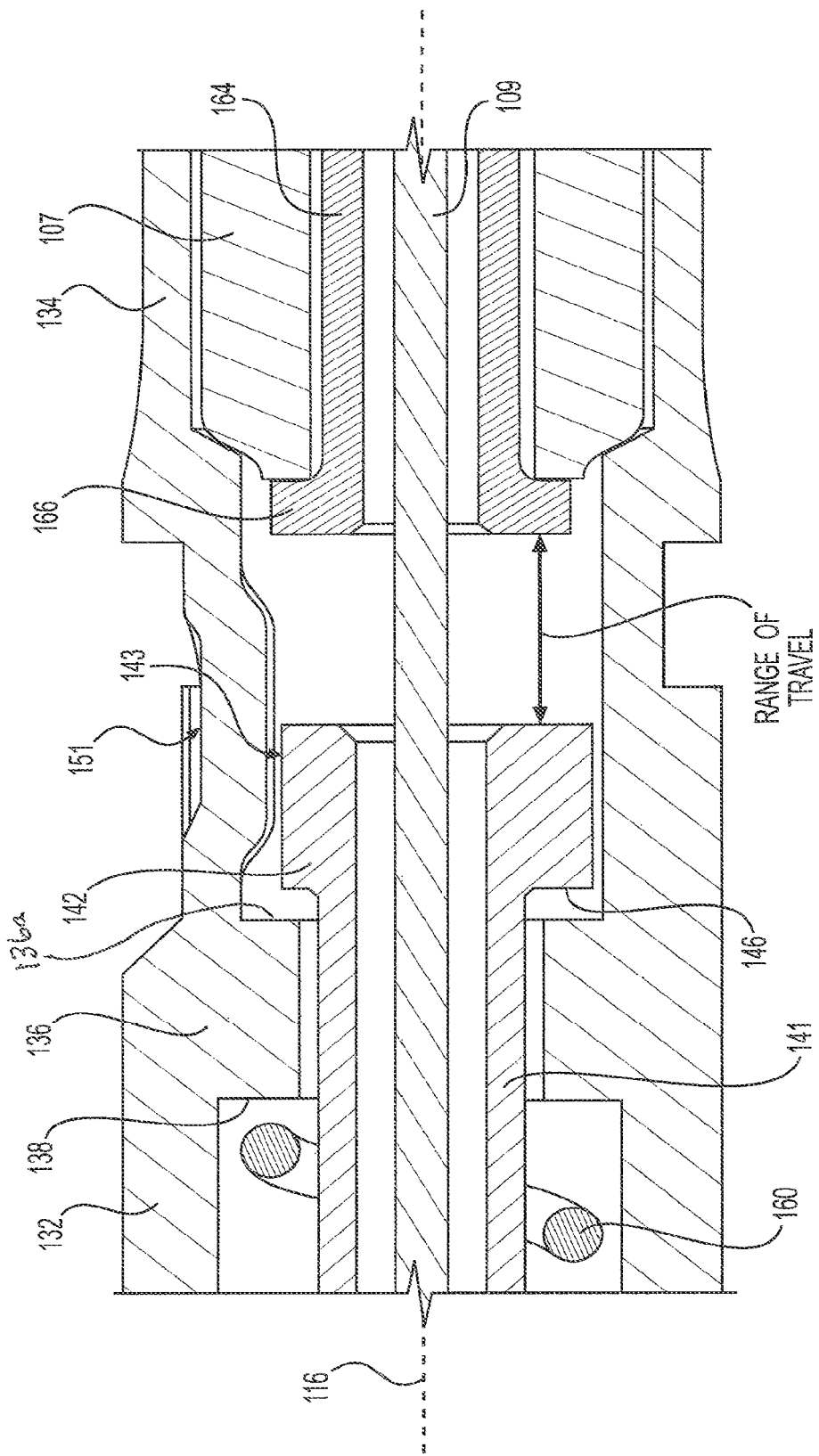
FIG. 4 is a cross-sectional view of a portion of the connector subassembly of FIG. 2.
Figure 5:
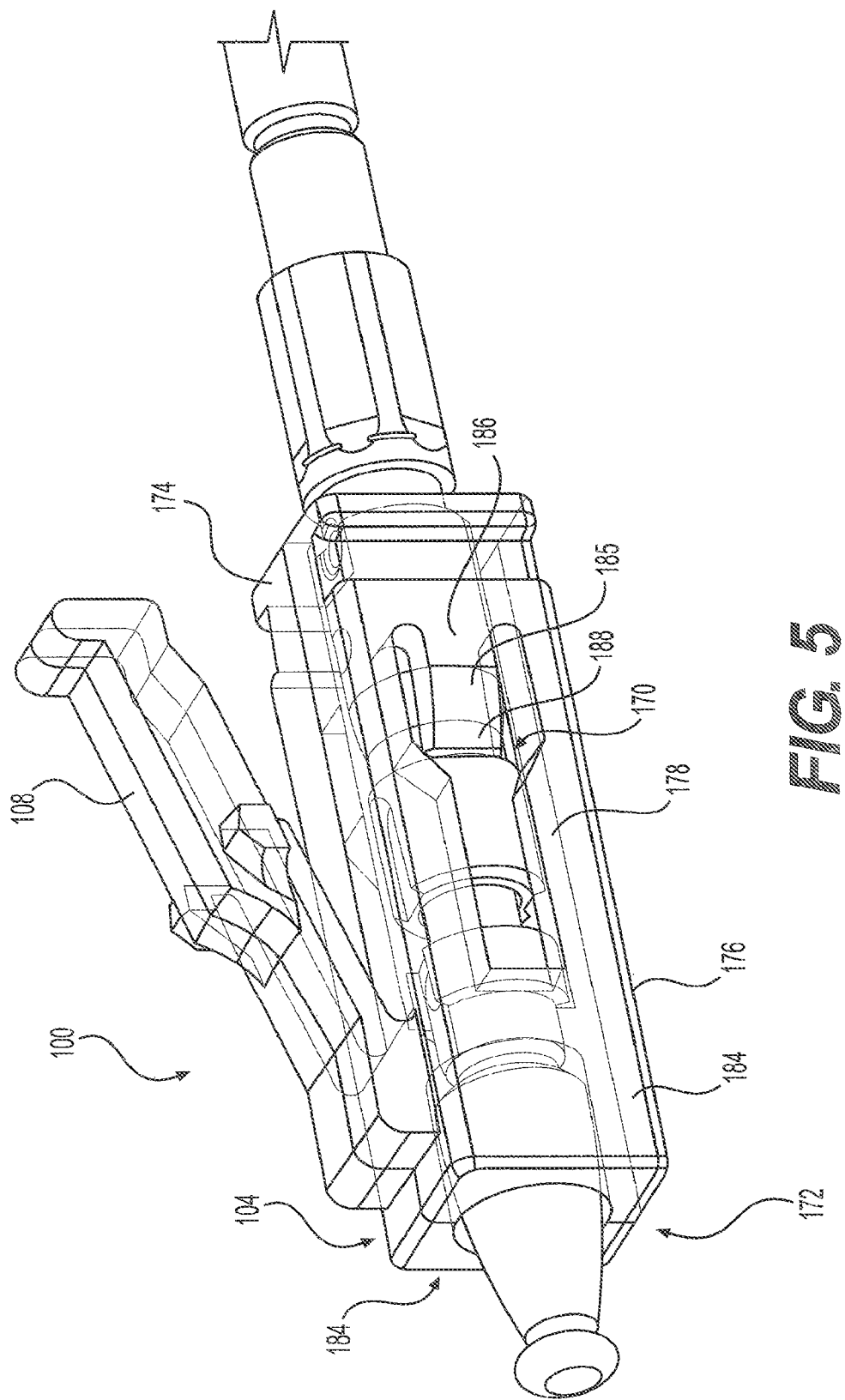
FIG. 5 is a perspective view of the fiber optic connector of FIG. 1.
Figure 6:
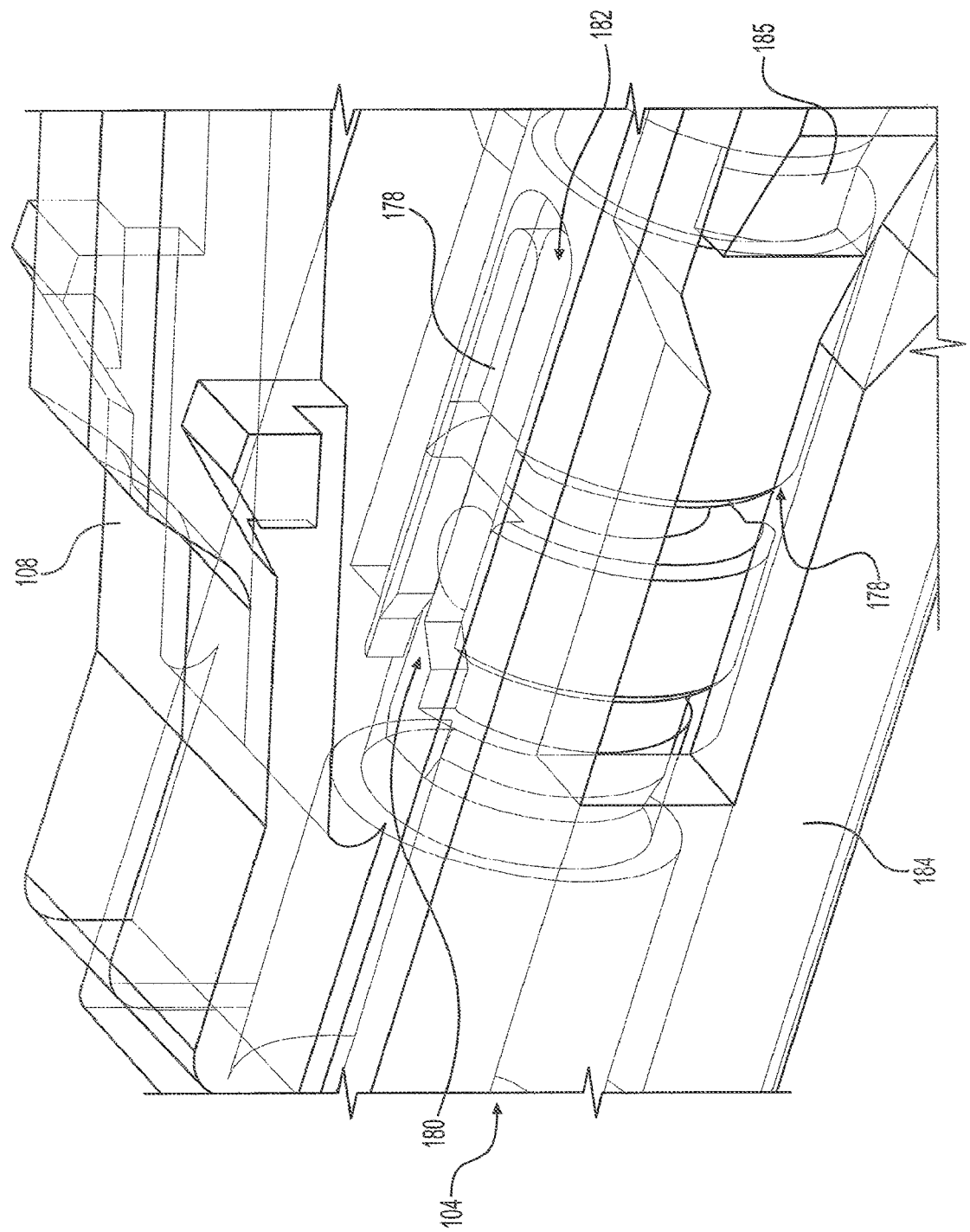
FIG. 6 is a perspective view of a portion of the fiber optic connector of FIG. 1.
Figure 11:
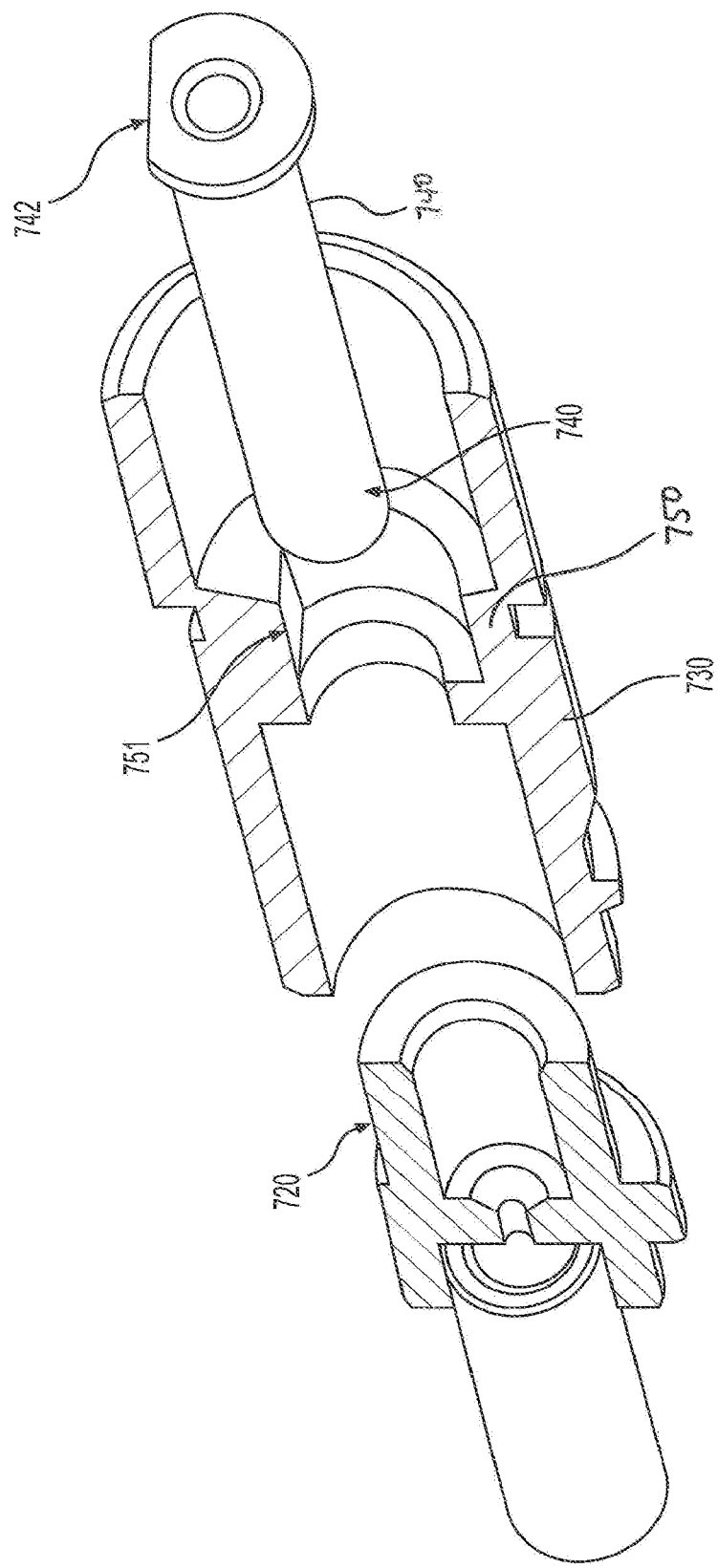
FIG. 11 is an exploded, cross-sectional perspective view of a portion of the connector subassembly of FIG. 7.

The connector sub-assembly 102 further includes a coil spring 160 disposed between the connecting tube 140 and the retaining tube 130 in a radial direction and retained in an axial direction between a rear end face 125 of the cylindrical stem portion 124 and a forward face 138 of the inner annular shoulder 136. The coil spring 160 biases the ferrule holder 120 forwardly relative to the retaining tube 130, with the forward bias being limited by the abutment between the forward face 146 of the head portion 142 and the rearward face 136a of the inner annular shoulder 136 of the retaining tube 130. The coil spring 160 is compressible in the axial direction by axial sliding movement of the stem portion 124 relative to the retaining tube 130. The axial range of travel of the ferrule holder 120 and connecting tube 140 is determined by the axial length of the small inner diameter portion 150 of the retaining tube 130, as shown in FIG. 4.

The connector 100 may further include a removable protective cap 162 having a bore configured to receive the ferrule 112. The connector 100 may also include a tubular member 164 having a through bore configured to receive the fiber 108 and the buffering layers 109 and to be inserted between the buffering layers 109 and the sheath 107 at the end of the sheath 107. The tubular member 164 may protect the fiber 108 during crimping of the large diameter portion 152 of the retaining tube 130. The tubular member 164 includes an outer shoulder 166 at its forward end to limit insertion of the tubular member 164 into the sheath 107 of the cable 106. The small inner diameter portion 150 is sized and configured to receive the outer shoulder 166. The connector 100 may also include a boot 168 around the cable 106 that is configured to abut the rearward end of the connecting tube 130 and the rearward end of the outer housing 104. The boot 168 is configured to provide strain relief for the cable 106 and a weather resistant seal at the rearward end of the connector 100.

The outer housing 104 is configured in a substantially square shape with a release lever 108 projecting outward from a top wall 174 of the outer housing 104, for example, as is typical with conventional LC connectors. The outer housing 104 includes a through bore 170 configured to receive the connector sub-assembly 102 such that the ferrule 112 can be exposed at a front end 172 of the outer housing 104. The inner surfaces of the top wall 174 and a bottom wall 176 of the outer housing 104 include alignment ribs 178. The alignment ribs 178 are configured to be received by axial alignment channels 129, 139 in the outer walls of the ferrule holder 120 and the retaining tube 130, respectively. The alignment channels 129, 139 are disposed at diametrically opposed top and bottom portions of the ferrule holder 120 and the retaining tube 130, respectively. In some aspects, the outer wall of the ferrule holder 120 may include only a single alignment rib, and the outer housing may include only a single alignment channel.

The alignment ribs 178 are tapered from a first width (i.e., in a direction perpendicular to the ferrule axis) at a forward end 180 to a second width at a rearward end 182. The first width of the ribs 178 substantially matches a width of the alignment channels 129, 139. The tapered profile allows freedom of movement and the rearward end 182 of the ribs 178 serves as a hard stop relative to a rearward end of the alignment channels 139 of the retaining tube 130.

The outer housing 104 further includes side walls 184 having resilient fingers 185 extending inward into the through bore 170. Each of the resilient fingers 185 may be cantilevered at its rear end 186, and the free forward end 188 of each finger 185 is configured to engage the rearward facing surface of the external shoulder portion 133 of the forward end portion 132 of the retaining tube 130 when the retaining tube 130 is inserted into the outer housing 104 to couple the housing 104 with the sub-assembly 102.

Referring now to FIGS. 7-11, another exemplary fiber optic connector 700, for example, an LC connector, in accordance with various aspects of the disclosure is illustrated. The exemplary fiber optic connector 700 is similar to the fiber optic connector described above, except that the small diameter portion 750 of the retaining tube 730 includes a cross-sectional profile 751 along its length that matches the D-shaped profile of the head portion 742 of the connecting tube 740. When the head portion 142 of the connecting tube 740 is received in the generally cylindrical bore small diameter portion 750 of the retaining tube 730, the cross-sectional profile 751 cooperates with the D-shaped profile of the head portion 742 to prevent relative rotation between the connecting tube 740 and the retaining tube 730.

As shown in FIGS. 8-10, the outer walls of the ferrule holder 720 and the retaining tube 730 may be generally cylindrical with flattened regions 729, 739 that are aligned with one another. The outer housing 704 may include a bore having a top wall 774 with a flattened inner surface 778 configured to be aligned with the flattened regions 729, 739 of the ferrule holder 720 and the retaining tube 730, respectively, to prevent relative rotation between the outer housing 704 and the connector sub-assembly 702.

Figure 14:
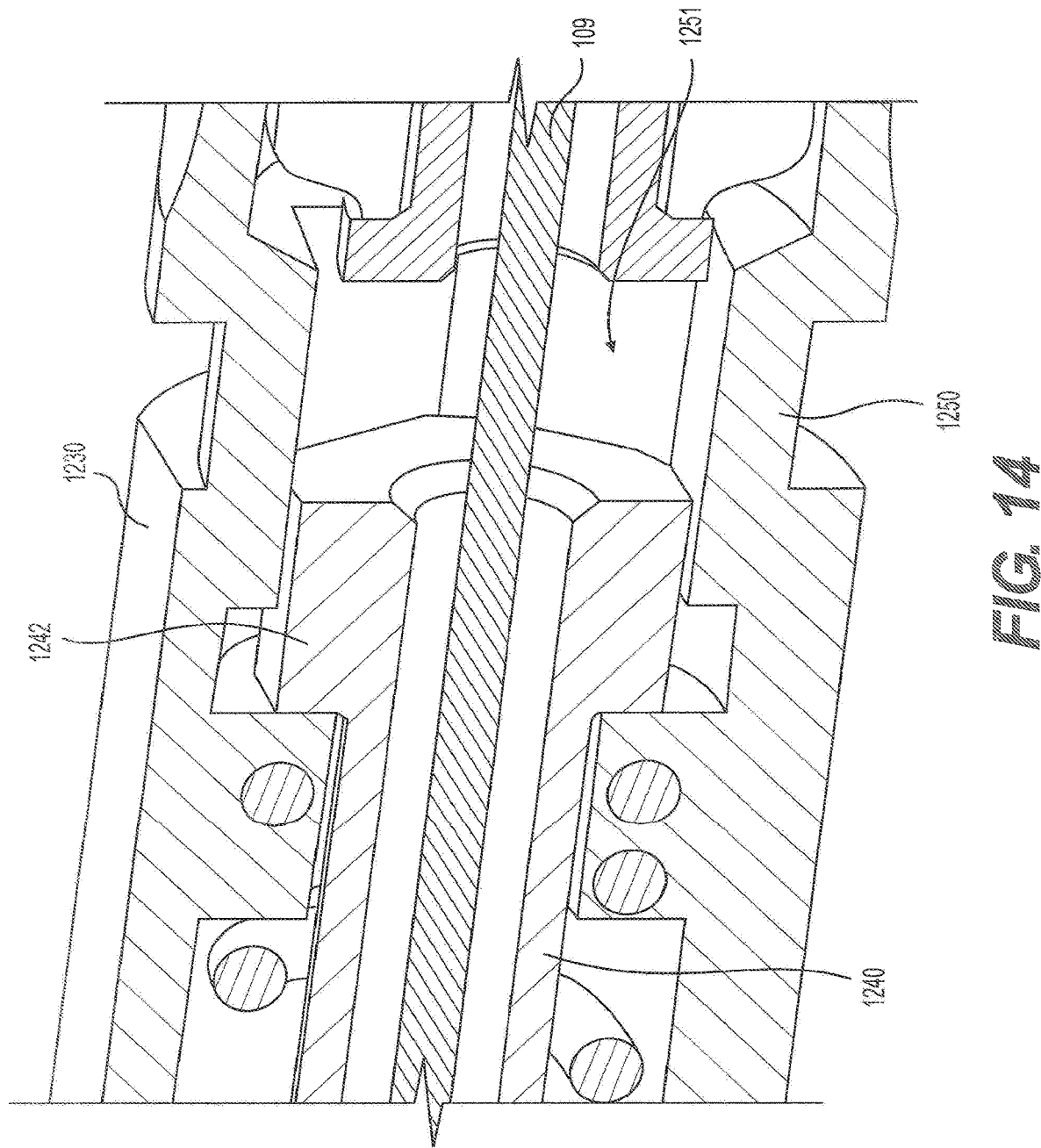
FIG. 14 is a cross-sectional perspective view of a portion of the connector subassembly of FIG. 12.

Referring now to FIGS. 12-14, another exemplary fiber optic connector subassembly 1204 in accordance with various aspects of the disclosure is illustrated. The exemplary fiber optic connector sub-assembly is for use with the fiber optic connector 700, and is similar to the fiber optic connector sub-assemblies 102, 702 described above, except that head portion 1242 of the connecting tube 1240 has a hex profile, and the small diameter portion 1250 of the retaining tube 1230 includes a matching hex profile 1251 along its length. When the head portion 1242 of the connecting tube 1240 is received in the generally cylindrical bore small diameter portion 1250 of the retaining tube 1230, the cross-sectional hex profile 1251 cooperates with the hex profile of the head portion 1242 to prevent relative rotation between the connecting tube 1240 and the retaining tube 1230.

It should be appreciated that although the outer housing 104 is illustrated as transparent to facilitate an understanding of the connector, the outer housing is not typically transparent.

It should be noted that although the specific example described above relates to LC-type connectors, the optical fiber connector sub-assembly can be adapted for use with other types of optical fiber connector systems, for example SC-type connectors and ST-type connectors.

Additional embodiments include any one of the embodiments described above, where one or more of its components, functionalities or structures is interchanged with, replaced by or augmented by one or more of the components, functionalities, or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. An optical fiber connector sub-assembly for an optical fiber connector, comprising:
   a ferrule configured to hold an optical fiber therein along an axis of the connector;
   a holding portion configured to hold the ferrule at a front portion of the connector;
   a retaining tube having a front end portion configured to hold the holding portion and a rear end portion configured to receive a fiber optic cable;
   a connecting tube configured to be received in the holding portion in a press fit relationship such that the connecting portion tube is rotatingly coupled with the holding portion;
   wherein the connecting tube is configured to be slidingly received by the retaining tube;
   wherein the holding portion, the retaining tube, portion tube, and the connecting tube are configured to receive an optical fiber;
   wherein the connecting tube includes a head portion having a radially outward facing surface with a flattened region; and
   wherein the retaining tube includes an inner wall having a radially inward facing wall with a flattened region configured to face and be aligned with the flattened region of the connecting tube to prevent relative rotation between the holding portion and the retaining tube.

2. A connector comprising:
   the optical fiber connector sub-assembly of claim 1; and
   an outer housing configured to be coupled with the optical fiber connector subassembly.

3. The connector of claim 2, wherein the outer housing is configured to provide Lucent Connection (LC) push/pull engagement/disengagement with a mating optical fiber socket.

4. The optical fiber connector sub-assembly of claim 1, wherein the retaining tube includes a forward end portion and a rearward end portion, the forward end portion and the rearward end portion being separated at an interior of the retaining tube by an inner annular shoulder.

5. The optical fiber connector sub-assembly of claim 4,
wherein the forward end portion of the retaining tube includes a bore configured to slidingly receive at least a portion of the holding portion,
wherein the rearward end portion of the retaining tube includes a bore configured to slidingly receive the connecting tube, and
wherein the connecting tube extends through a bore defined by the inner annular shoulder.

6. The optical fiber connector sub-assembly of claim 1,
wherein the head portion of the connecting tube includes at least one additional flattened region, and
wherein the inner wall of the rearward end portion of the retaining tub includes at least one additional flattened region configured to be aligned with the at least one additional flattened region of the connecting tube.

7. The optical fiber connector sub-assembly of claim 1, further comprising a biasing portion disposed between a rearmost surface of the holding portion and a forward facing surface of the retaining tube.

8. An optical fiber connector sub-assembly for an optical fiber connector, comprising:
a ferrule configured to hold an optical fiber therein;
a holding portion configured to hold a ferrule;
a retaining tube having a front end portion configured to hold the holding portion and a rear end portion configured to receive a fiber optic cable; and
a connecting portion configured to be received in and rotatingly coupled with the holding portion and slidingly received by the retaining tube,
wherein the holding portion, the retaining tube, and the connecting portion are configured to receive an optical fiber, and
wherein the connecting portion includes a head portion having a radially outward facing surface with a flattened region, and wherein the retaining tube includes an inner wall having a radially inward facing wall with a flattened region configured to face and be aligned with the flattened region of the connecting portion to prevent relative rotation between the holding portion and the retaining tube.

9. A connector comprising:
the optical fiber connector sub-assembly of claim 8; and
an outer housing configured to be coupled with the optical fiber connector subassembly.

10. The connector of claim 9, wherein the outer housing is configured to provide Lucent Connection (LC) push/pull engagement/disengagement with a mating optical fiber socket.

11. The optical fiber connector sub-assembly of claim 8,
wherein the retaining tube includes a forward end portion and a rearward end portion, and wherein the forward end portion and the rearward end portion are configured to be separated at an interior of the retaining tube by an inner annular shoulder.

12. The optical fiber connector sub-assembly of claim 11,
wherein the forward end portion of the retaining tube includes a bore configured to slidingly receive at least a portion of the holding portion;
wherein the rearward end portion of the retaining tube includes a bore configured to slidingly receive the connecting portion; and
wherein the connecting portion extends through a bore defined by the inner annular shoulder.

13. The optical fiber connector sub-assembly of claim 8,
wherein the head portion of the connecting portion includes at least one additional flattened region; and
wherein the inner wall of the rearward end portion of the retaining tube includes at least one additional flattened region configured to be aligned with the at least one additional flattened region of the connecting portion.

14. The optical fiber connector sub-assembly of claim 8, further comprising a biasing portion disposed between a rearmost surface of the holding portion and a forward facing surface of the retaining tube.

15. An optical fiber connector sub-assembly for an optical fiber connector, comprising:
a holding portion configured to hold a ferrule;
a retaining tube configured to hold the holding portion and to receive a fiber optic cable;
a connecting portion configured to be received in and rotatingly coupled with the holding portion and slidingly received by the retaining tube;
wherein the holding portion, the retaining tube, and the connecting portion are configured to receive an optical fiber; and
wherein the retaining tube includes a radially inward facing flattened region configured to face and be aligned with a radially outward facing flattened region of the connecting portion to prevent relative rotation between the holding portion and the retaining tube.

16. A connector comprising:
the optical fiber connector sub-assembly of claim 15; and
an outer housing configured to be coupled with the optical fiber connector subassembly.

17. The connector of claim 16, wherein the outer housing is configured to provide Lucent Connection (LC) push/pull engagement/disengagement with a mating optical fiber socket.

18. The optical fiber connector sub-assembly of claim 15,
wherein the retaining tube includes a forward end portion and a rearward end portion, and wherein the forward end portion and the rearward end portion are configured to be separated at an interior of the retaining tube by an inner annular shoulder.

19. The optical fiber connector sub-assembly of claim 18,
wherein the forward end portion of the retaining tube includes a bore configured to slidingly receive at least a portion of the holding portion;
wherein the rearward end portion of the retaining tube includes a bore configured to slidingly receive the connecting portion; and
wherein the connecting portion extends through a bore defined by the inner annular shoulder.

20. The optical fiber connector sub-assembly of claim 18,
wherein the connecting portion includes an elongated cylindrical portion having a head portion at its rear end, the head portion including a flattened region; and
wherein the rearward end portion of the retaining tube includes an inner wall having a flattened region configured to be aligned with the flattened region of the connecting portion.

21. The optical fiber connector sub-assembly of claim 20,
wherein the head portion of the connecting portion includes at least one additional flattened region; and
wherein the inner wall of the rearward end portion of the retaining tube includes at least one additional flattened region configured to be aligned with the at least one additional flattened region of the connecting portion.

22. The optical fiber connector sub-assembly of claim 18,
wherein a forward end portion of the connecting portion is configured to be received in the holding portion in a press fit relationship such that the connecting portion is rotatable with the holding portion.

23. The optical fiber connector sub-assembly of claim 15, further comprising a biasing portion disposed between a rearmost surface of the holding portion and a forward facing surface of the retaining tube.

\* \* \* \* \*